W. PAINTER.
COUNTERFEIT COIN DETECTER.
No. 7,620.
Reissued April 17, 1877.
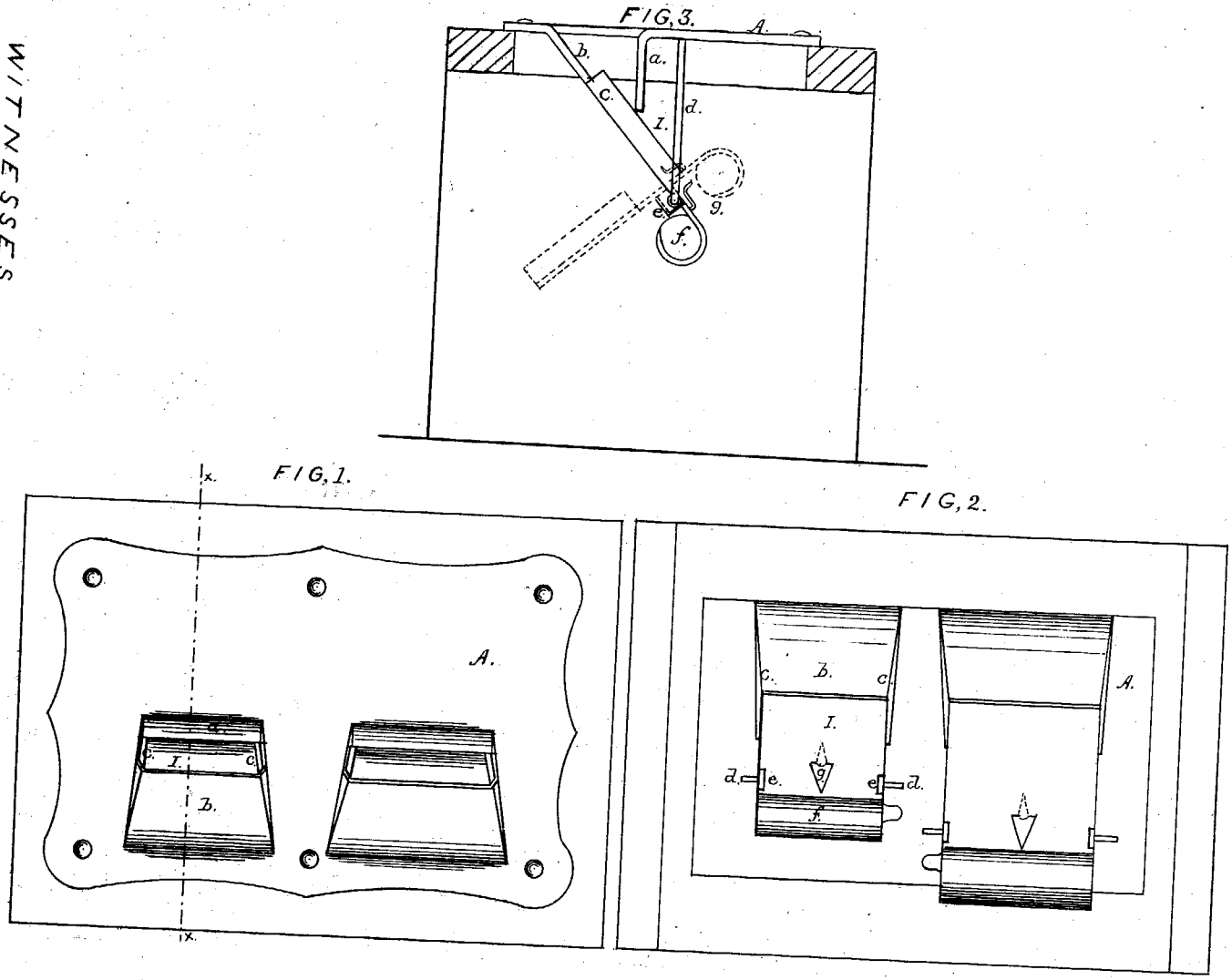
WITNESSES.
John T. Williams,
Charles D. Bonnet
INVENTOR.
William Painter.

UNITED STATES PATENT OFFICE.

WILLIAM PAINTER, OF BALTIMORE, MARYLAND.

IMPROVEMENT IN COUNTERFEIT-COIN DETECTERS.

Specification forming part of Letters Patent No. 35,834, dated July 8, 1862; reissue No. 7,620, dated April 17, 1877; application filed March 7, 1877.

*To all whom it may concern:*

Be it known that I, WILLIAM PAINTER, of Baltimore, formerly of Fallston, Maryland, have invented a new and useful Improvement in Counterfeit-Coin Detecter; and I do hereby declare that the following is a full, clear, and exact description of the same, reference being had to the accompanying drawings, in which—

Figure 1 is a plan or top view of the detecter mounted on a stand; Fig. 2, an inverted plan of the same; and Fig. 3, a vertical section taken at the line *x x*, Fig. 1.

Similar letters of reference indicate corresponding parts in the several figures.

My improvements relate to that class of coin-detecters which embody weighing-scales and gages, and are automatic in their action, in that no manipulation of the coin is requisite beyond passing it through a gage to the scale, from which it is delivered by tilting.

The objects of my invention are to obviate the liability of the scales being tilted other than by the actual weight of the coin, and also to enable the detecter to test the coin by its sound or ring when discharged from the scale. These ends are attained mainly by means of a scale, upon which the coin is supported flatwise, and from which, on tilting, the coin slides flatwise, and falls in a position favorable for sounding. With such a scale I use a guiding-plate, which enables the coin to be placed upon the scale without such shock as would induce a tilting movement thereof. I also combine, with such a scale, gages which test the thickness and diameter of the coin.

To enable others skilled in the art to understand and construct my invention, I will describe it particularly.

A represents a metal plate, which is screwed to the top of the counter or table directly over a receptacle or drawer, or mounted upon a stand, as shown, for use as a portable detecter. This plate is slotted or cut in the form of an H, and the metal, *a*, at the back part of the cut bent down to about a vertical position, the metal, *b*, at the front part of the cut being bent down so as to form an inclined plane at an angle of about forty-five degrees, as shown clearly in Fig. 3. I is a spout or scale-pan, which may be formed of a plate of sheet metal bent upward at its sides, as shown at *c c* in Fig. 1. The scale or pan is suspended between two vertical rods, *d d*, which are secured to the under side of the plate A, and are bent toward each other horizontally at their lower ends, and fitted in pendent ears *e e*, attached to the spout or pan I. It is allowed to work freely on the lower ends of the rods *d d*, and is loaded at its back end, as shown at *f*, so as to keep the upper edges of the sides *c c* in contact with the lower edges of *a*, and the front edge of the spout on line with the inclined plane *b*, as shown in Fig. 3. The weight *f* is designed to be a trifle lighter than a genuine coin to be tested, and the width of the spout I—that is to say, the space between the sides *c c*—is to be wider than the diameter of the coin, and the space between the bottom of the spout I and the lower edge of *a* equal in height to the thickness of said coin. The spout I is provided with a stop or projection, *g*, at its lower part, and the distance between this stop and the lower edge of the inclined plane *b* is equal to the diameter of a genuine coin.

The spouts I may be made of various sizes to suit different coins, and loaded accordingly.

The invention, it will, of course, be seen, is applicable to both gold and silver coins.

I would remark that the pendent rods *d d* may be allowed to yield or give a trifle under pressure, in order to compensate for the slight variation in diameter of standard coin produced by the milling of the edges. This variation, however, is so slight that it cannot effect the efficiency of the device as a detecter.

It will be observed that the coin, in its movement along the guiding-plate to the scale, moves in substantially the same plane with the surface of the scale, and therefore the movement of the coin cannot impart to the scale any movement other than that which is due solely to the actual weight of the coin; and, further, that the coin, when discharged from the scale, cannot roll away on its edge, but will so drop as to develop its sounding quality, and thereby will be detected, even if it be of the standard size and weight, because in that case the metal of which it is composed will fail in the well-known sounding quality of genuine coin.

Having described my invention, what I claim, and desire to secure by Letters Patent, is—

1. In a coin-detecter, a tilting scale pan, adapted to receive the coin flatwise for testing, and to discharge the same automatically after testing, substantially as and for the purpose set forth.

2. The combination, with a suitable standard or frame, of a scale which is tilted by the coin lying flatwise on its pan, and which, when tilted, permits the coin to slide and fall therefrom, substantially as described, whereby its sounding quality may be tested, as set forth.

3. The combination, with a scale which is tilted by the coin lying flatwise thereon, of a stationary guide-plate, substantially as described, whereby a coin moved flatwise on the plate may be placed upon the scale-pan without inducing a tilting action other than that due to the weight of the coin, as set forth.

4. The combination, with a scale-pan which is tilted by coin lying flatwise thereon, of a guide-plate and gage for testing the diameter of the coin, substantially as described.

5. In a coin-detecter, the combination, with a tilting scale having a flat-faced pan and guiding-plate, of gages which test the diameter and thickness of the coin, substantially as described.

WILLIAM PAINTER.

Witnesses:

A. B. CAULDWELL,

WM. C. WOOD.